June 30, 1964 — F. C. BASELT — 3,139,343
METHOD OF PREPARING AND DISPENSING COMESTIBLES
Filed May 11, 1960 — 3 Sheets-Sheet 1

INVENTOR.
FREDERICK CHRISTIAN BASELT
BY George P. Ziehmen Jr.
AGENT

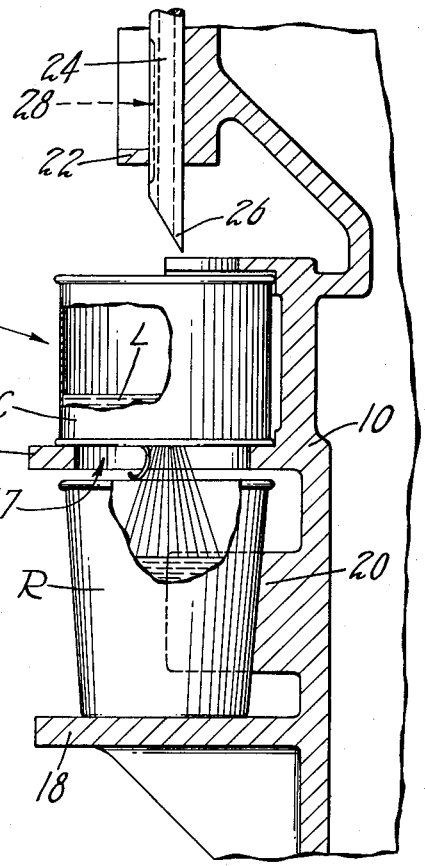
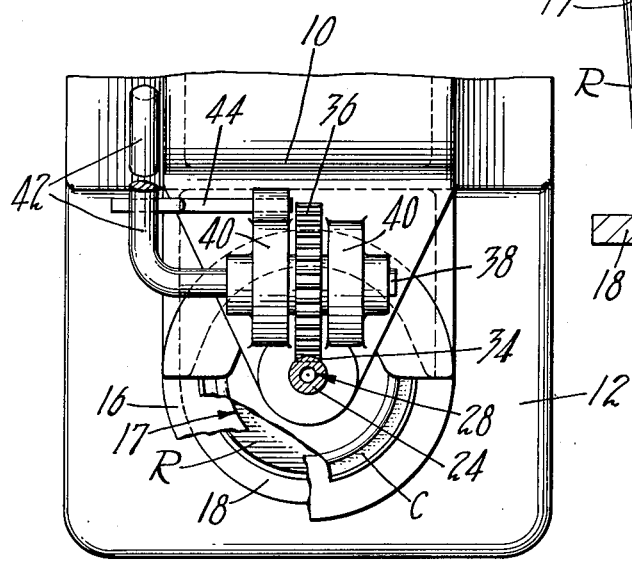

June 30, 1964    F. C. BASELT    3,139,343
METHOD OF PREPARING AND DISPENSING COMESTIBLES
Filed May 11, 1960    3 Sheets-Sheet 3
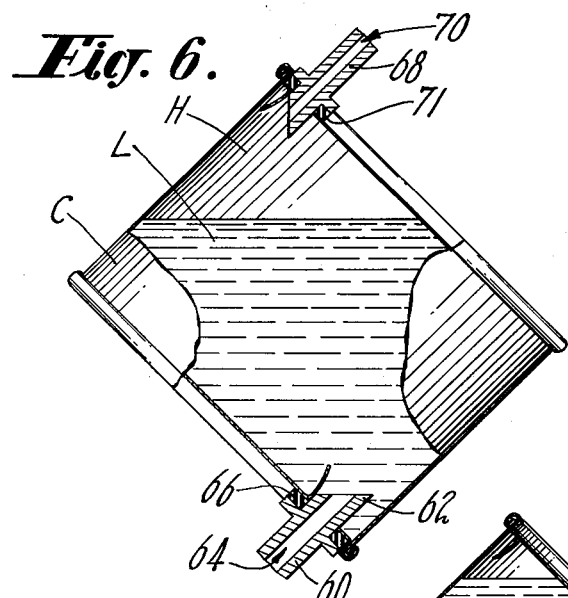
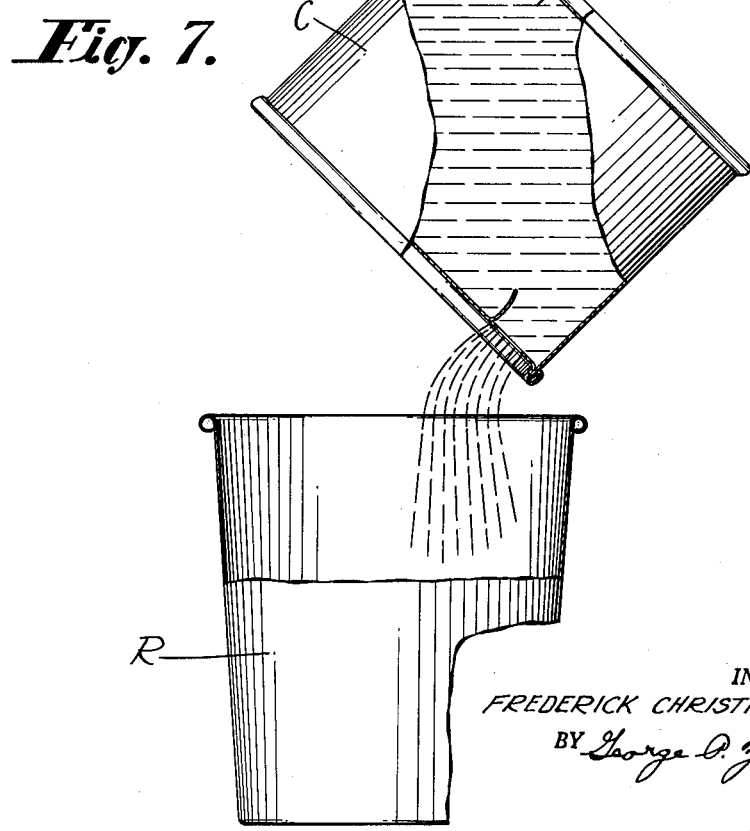
INVENTOR.
FREDERICK CHRISTIAN BASELT
BY George P. Niehmer Jr.
AGENT 3,139,343
METHOD OF PREPARING AND DISPENSING COMESTIBLES
Frederick Christian Baselt, New York, N.Y., assignor to American Can Company, New York, N.Y., a corporation of New Jersey
Filed May 11, 1960, Ser. No. 28,446
6 Claims. (Cl. 99—71)

The present invention relates to a method of vending comestible products such as liquid coffee or the like, and has particular reference to a method of packing an individual portion of such a product in a hermetically sealed can and subsequently, immediately prior to its consumption, injecting steam into the interior of the can in order to rapidly heat the product to serving temperature and to add to it an amount of water sufficient to bring it to a desired formulation.

There are on the market at the present time, for use in cafeterias and lunchrooms, machines for vending individual heated cans of liquid or semi-liquid foods such as soup and beef stew. When the consumer desires to buy a can of such food, he inserts a coin in the coin slot of the vending machine and a heated, unopened can is automatically delivered to him. Thereupon, he takes the heated can to a conveniently located can opening machine and cuts out its top end, thereby rendering the hot food within the can accessible to him for immediate consumption.

In such machines, the cans are placed in a heated compartment to heat their contents to the desired eating temperature. This method of heating is quite slow, and in order to insure that a heated can is always available, the heated compartment is utilized as the storage magazine of the machine. Thus, the cans remain heated from the time they are loaded into the machine until the time they are dispensed from it. As a consequence, if business is slack, the product in the cans could be maintained at an elevated temperature for many hours, or even days, with the result that the normal deterioration in taste which always results when food is maintained at an elevated temperature for too long a time, could occur. To prevent this, the custodian of the vending machine usually follows a loading schedule which is intended to limit the period during which the cans in the machine are kept at an elevated temperature. However, this entails additional work and expense, and constitutes an undesired inconvenience.

The present invention eliminates this bother by making it unnecessary to heat the cans prior to dispensing them. This is made possible by the provision of a method of vending wherein the product is rapidly heated by the injection of saturated or superheated steam into the interior of the individual can. When utilized in a vending machine, this method makes it possible to heat a can within a matter of seconds after the customer inserts his coin into the machine. In order to thus quickly heat the product within the can, large quantities of steam must be injected into it, and this steam, upon coming into contact with the relatively cool product, condenses to form water which mingles with and becomes a part of the product. To prevent undesired dilution of the product, it is initially formulated so that it is in a slightly concentrated condition. Thus, the addition of the water has the effect of bringing the product to a desired normal condition whereinit is neither concentrated or diluted. In other words, instead of adding all of the water called for by the recipe or formulation to the product prior to the time it is canned, some of the water is omitted. Later, when the can is heated by the injection of steam, the hitherto omitted water is added in the form of condensed steam, and the ultimately desired formulation is obtained.

In following this practice, it is of course necessary to provide sufficient headspace in the sealed can to accommodate the water which is added to the contents by the injection of the steam. Generally speaking, it has been found that the contents of a can can be rapidly heated from a normal room temperature of about 70° F. to a desired serving temperature of about 150° F. by the injection of steam sufficient upon condensation to increase the volume of the contents by about 8% to 13%. To accommodate this increase in volume, a commensurate portion of the interior volume of the can must be left unfilled. Also, additional headspace must be provided to compensate for displacement by the member which is inserted into the can to inject the steam into the product.

Preferably, this headspace is vacuumized so that in the event the headspace is not vented during the injection of the steam, there will be no gas in it to be compressed as the volume of liquid within the can increases. However, it is also possible to fill the headspace with an inert gas if the headspace is vented during the steam injecting operation to permit the escape of this gas as it is displaced by the condensing steam. It is usually undesirable to permit air to remain in this headspace, since the oxygen therein usually reacts with the comestible to produce staleness and off flavors.

It will be obvious that the present method is best suited to liquid comestibles such as liquid coffee, liquid tea, soup, chocolate drink, and the like, which permit the rapid distribution of heat by convection of the heated liquid, as augmented by the agitation of the product by the injected steam. However, it can also be used with comestibles which are composed of small individual pieces in a liquid base. Examples of such products are canned stews, canned vegetables, and the like.

An object of the invention is the provision of a method of vending individual sealed cans of comestibles wherein the cans may be stored, prior to use, at or below room temperature to prevent deterioration of the product, and yet may be heated to the desired serving temperature almost immediately when called for by the consumer.

Another object of the invention is the provision of a method of vending comestible products wherein live steam is utilized to heat the product rapidly to serving temperature.

Still another object of the invention is the method of vending comestibles wherein the product is preferably initially packed in a slightly concentrated condition and is brought to the desired formulation by the addition of the water produced by the condensation of steam which is injected directly into the product to heat it to serving temperature.

Yet another object is the provision of a method of vending canned comestibles which is particularly adapted to the serving of liquid or semi-liquid foods.

Still another object is the provision of a method of vending comestibles which is particularly suitable for use in automatic vending machines.

Numerous other objects and advantages of the invention will be apparent as it is better understood from the following description, which, taken in connection with the accompanying drawings, discloses a preferred embodiment thereof.

Referring to the drawings:

FIG. 4 is a view similar to FIG. 3 showing the steam injecting member withdrawn from the can to permit the heated contents to flow through the pouring opening and into a serving cup which is positioned below the can;

FIG. 5 is a plan view of the apparatus of FIG. 1; and

FIGS. 6 and 7 are views illustrating a modified manner of carrying out the heating and dispensing steps of the instant invention.

As a preferred and exemplary embodiment of the instant invention, the drawings illustrate the invention as applied to the vending of canned liquid coffee which may be prepared according to the teachings of United States Letters Patent 2,291,604, granted to F. C. Baselt on August 4, 1942, and entitled "Method of Canning Liquid Coffee Beverage."

In initially preparing the liquid coffee for the purposes of the present invention, only about 90% of the amount of water which would normally be utilized for the brewing of a given weight of ground coffee is used, so that the resultant coffee is somewhat concentrated and over strength. As an example, if the ultimately desired strength of the liquid coffee as served is such that 1 lb. of ground coffee would produce about 44 cups of liquid coffee, only sufficient water to produce about 40 cups of coffee per pound of ground coffee should be used when initially brewing the coffee in practicing the instant invention. The resultant over-strength liquid coffee is then filled into cans C which are thereafter hermetically sealed as described in the previously mentioned Patent 2,291,604.

Figure 1:
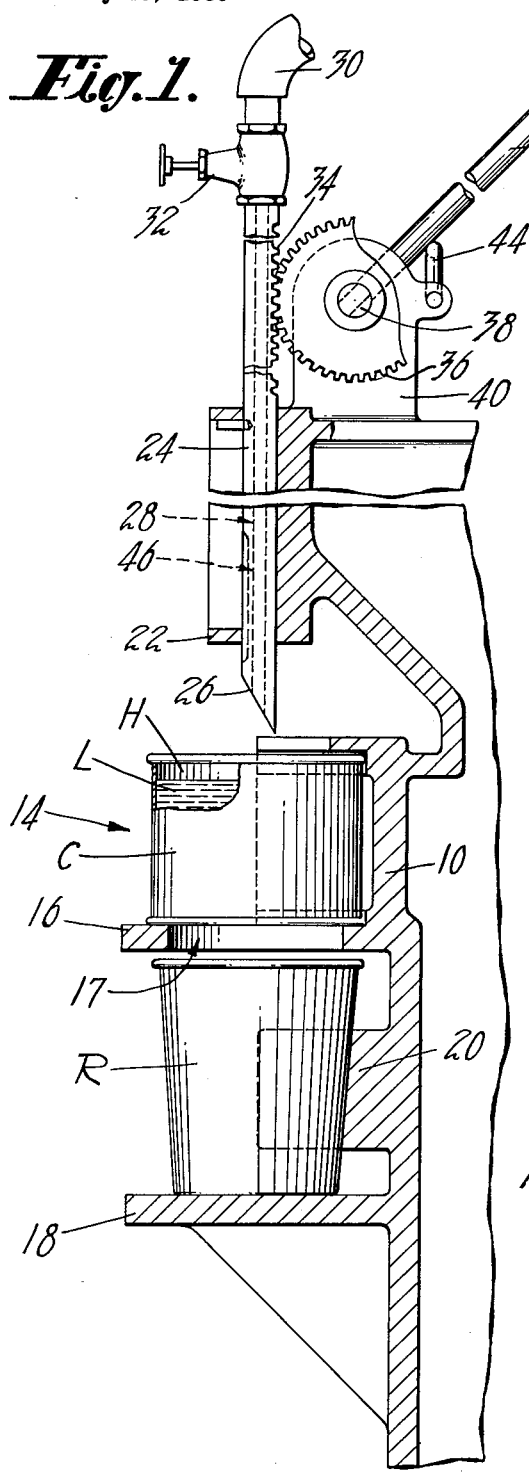
FIGURE 1 illustrates a side elevation of a simple apparatus which is suitable for carrying out the heating and dispensing steps of the instant invention when used in conjunction with a liquid product, the various parts of the apparatus being shown prior to the insertion of the steam injecting member into the interior of the can.

As seen in FIG. 1 the liquid coffee L does not completely fill the sealed can C, an unfilled headspace H of at least 10% of the volume of the can being provided.

The headspace H is preferably vacuumized so that little or no air or other gas remains therein, although if desired, an inert gas such as carbon dioxide may be introduced into the headspace H prior to the can sealing operation.

After the individual cans C of liquid coffee L have been hermetically sealed, they are distributed and/or stored in the usual manner. During such time, they are preferably maintained at or below normal room temperatures in order to prevent deterioration in the taste of the coffee L. If desired, they may be refrigerated during storage for maximum preservation of the true coffee flavor.

When it is desired to vend the contents of an individual can C, the can is removed from its place of storage and heated to serving temperature by means of a jet of steam which is injected into the interior of the can directly into the liquid coffee L.

FIGURES 1 through 5 show a simple form of apparatus which is suitable for carrying out these method steps of the invention. This apparatus comprises an upright frame 10 which stands upon a suitable base 12 (see FIG. 5). The frame 10 is provided with a generally semi-circular can receiving pocket 14 which includes a can supporting shelf 16, the center portion of the shelf being open so that an opening 17 is provided beneath the central portion of the bottom end of the can.

The frame 10 also includes a second shelf 18 which is positioned below the shelf 16 and which supports a suitable serving receptacle R which preferably takes the form of a conventional paper cup, a centering guide 20 being provided to locate the cup R directly below the can C.

At its upper end, the frame 10 is provided with a bearing 22 which is slidingly keyed to a vertically reciprocable stem or injection member 24 which at its bottom end is angled to form a cutting tip 26. The member 24 is formed with a full length central bore 28, and at its upper end is connected to a hose or pipe 30 which leads from a boiler or other suitable source of steam. A shut-off valve 32 is provided at the upper end of the member 24 so that the flow of steam may be turned on and off as desired.

The member 24 is provided, adjacent its upper end, with a plurality of teeth which form a rack 34 which is engaged by a pinion 36. The pinion 36 is secured to a shaft 38 which is mounted in suitable bearings 40, one end of the shaft 38 being bent upwardly to provide a handle 42. A suitable stop 44 is provided to limit the rearward rotation of the handle 42.

After the can C has been positioned on the shelf 16, as seen in FIG. 1, the handle 42 is pulled forwardly (in a counter clock-wise direction as seen in FIG. 1), thus causing member 24 to move downwardly so that its cutting tip 26 pierces the upper end of the can C.

Figure 2:
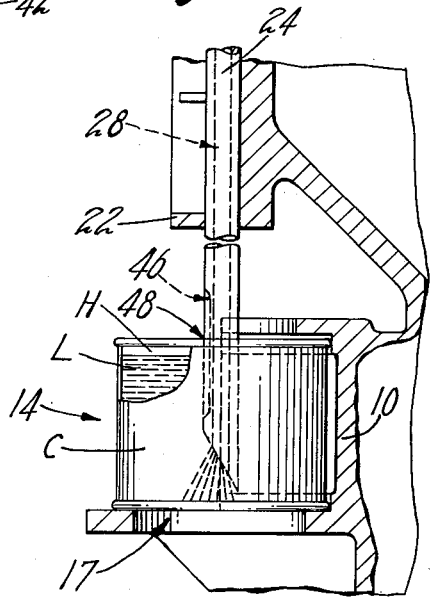
FIG. 2 is a view of a portion of the apparatus of FIG. 1 showing the steam injecting member in heating position within the can.
Figure 3:
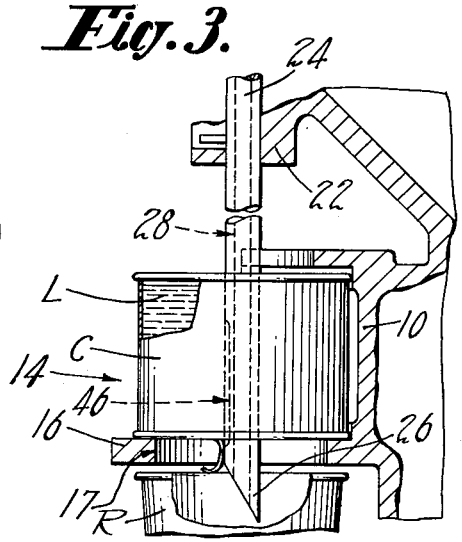
FIG. 3 is a view similar to FIG. 2 showing the steam injecting member as projected through the bottom end of the can, after the completion of the heating operation, in order to create a dispensing opening therein.

The downward movement of the member 24 continues until its lower end is positioned adjacent the bottom of the can, as best seen in FIG. 2. The valve 32 is then opened, thus causing the steam to flow through the bore 28 and into the interior of the can C. This steam gives up its heat to the relatively cool liquid coffee L immediately adjacent the stem tip 26 and condenses to form water which mingles with the coffee L and becomes a part of it. The heat imparted by the steam is rapidly transmitted throughout the can by convection and agitation so that the liquid coffee L is rapidly heated to a uniform serving temperature.

As a result of the condensation of the steam, water is added quite rapidly to the coffee with the result that the headspace H in the can rapidly fills with liquid. It will be obvious that if the headspace H is vacuumized, the vacuum will be broken when the upper end of the can is pierced by the member 24, with the result that atmospheric air is drawn into the can. If, on the other hand, this headspace H is initially filled with an inert gas such as carbon dioxide or nitrogen, such gas will remain in the headspace H after the can C is opened by the member 24. In either event, in order to permit the escape of such air or gas from the headspace H as water is added to the liquid coffee L by the condensing steam, a groove 46 is formed adjacent the lower end of the member 24 so that a vent aperture 48 is created. The injection of steam into the liquid coffee L is continued until it is heated to the desired serving temperature, at which time the valve 32 is closed to stop the flow of steam.

If the can C contains 8 ounces of liquid coffee L, the injection of about .05 lb. of saturated steam at a pressure of 15 lbs. per square inch will raise the temperature of the liquid coffee L from the average storage temperature of 70° F. to a serving temperature of 150° F. in from one to three seconds, depending on the size of the bore 28. This steam, when condensed, adds .8 ounce of water to the volume of liquid in the can C, thus providing to the consumer a serving of 8.8 ounces of liquid coffee L.

It will be obvious that these figures are merely exemplary, and can be varied considerably and still produce excellent results. Thus, if the pressure of the steam is increased, less steam will be required to produce the necessary increase in temperature, and less water will be added to the product. However, practical considerations will usually operate against the use of stem at too high a pressure.

If desired, the amount of steam injected can be automatically metered to insure the desired result. One way of doing this is to isolate a measured quantity of steam, at a specific pressure above atmospheric, within a tank and to connect the tank with the hose 30. In such event, the opening of the valve 32 will start the flow of steam and the resultant drop in pressure within the tank to atmospheric will automatically end such flow without the necessity of closing the valve 32.

After the steam has been injected into the liquid coffee, the valve 32 is closed, if necessary, and the handle 42 is pulled still farther to move the stem 24 downwardly and cause it to pierce the bottom end of the can C (see FIG. 3), thus creating a dispensing or pouring opening in it.

Thereafter, the handle 42 is moved in the opposite direction to return it to its starting position, thus clearing the openings in both the top and bottom ends, and permitting the now heated and full strength coffee to flow downwardly by gravity into the dispensing receptacle R which is positioned immediately below. During this flow of coffee, air enters the can C through the opening in its upper end.

Thereafter, the receptacle R with the serving of coffee therein, is made accessible to the consumer for ultimate consumption.

FIGS. 6 and 7 illustrate a slightly modified showing of the performance of the method steps of the invention. In this showing, the can C containing the liquid coffee L and headspace H is turned to a tilted position, as shown; a steam injecting member 60 having a piercing tip 62 is projected through its bottom end at the lowermost portion of the can; and steam is injected through a central bore 64 in a similar manner as in the showing of FIGS. 1–5. In this version, a suitable sealing gasket 66 is provided on the member 60 to prevent leakage of the coffee L during the steam injecting operation.

To vent the can C during the injection of steam, a vent punch 68 having a central bore 70 is projected through the top end of the can C at its highest point. When the flow of steam has been completed, both the member 60 and the vent punch 68 are removed from the can, and the heated coffee L is permitted to flow by gravity into the dispensing receptacle R. During these steps, the can C may be clamped in its inclined position in a supporting cradle or pocket (not shown). This version has an advantage over the version of FIGS. 1–5 in that less of the interior volume of the can C is occupied by the steam injecting member, and thus the headspace H may be reduced in volume.

If desired, the headspace H may be further reduced, or substantially eliminated, by providing the vent punch 68 with a sealing gasket 71, and permitting the liquid L within the can C, as its volume is increased by the condensation of injected steam, to flow up into the vent punch bore 70, which thus acts as a temporary reservoir until the coffee L is drained out of it after removal of the steam injecting member 60. In such event, the bore 70 must of course be of sufficient capacity to hold the added liquid.

In the event the comestible is only partially liquid, as in the case of stews and vegetables, it will be necessary to completely remove an end of the can in order to dispense it. In such event, the end may be removed either prior or subsequent to the injection of steam, and the product may either be dumped into a serving receptacle or served in the opened can C.

It will be understood that the drawings illustrate extremely simple devices for performing certain method steps of the invention, and that in practice, completely automatic devices for performing these steps may be embodied in a suitable automatic vending machine and operated in a timed cycle which is initiated by the insertion of a coin into the machine. In such a machine, the individual can will be automatically fed into position in an operating station for the cutting of the pouring and venting openings and the injection of steam, and a receptacle R will be automatically fed into position to receive the heated coffee L from the can C, and made accessible to the consumer. If desired, suitable automatic means may be provided to add sugar and cream to the coffee, as desired.

It will also be understood that it will not always be either necessary or desirable to formulate the comestible being vended so that it is initially concentrated, since it may be desirable to practice the invention in conjunction with canned products which are also to be merchandised in the usual manner. There are many instances where the addition of a relatively minor amount of water, such as the 10% here added, will not be objectionable or deleterious. This holds true even as to liquid coffee, since it is well known that the strength of brew may be varied widely, yet still produce an acceptable cup of coffee.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of preparing liquid and semi-liquid comestibles to be diluted and heated prior to serving, comprising the steps of packing a concentrated comestible in a hermetically sealed container while leaving a portion of said container unfilled, penetrating said container and said comestible with a hollow injection member, and injecting steam for a predetermined time through said injection member directly into said comestible to heat it to a desired serving temperature and to cause said steam to condense to thereby add a predetermined quantity of water to said comestible to bring it to a desired non-concentrated condition and to substantially fill said can.

2. A method of vending liquid and semi-liquid comestibles to be diluted and heated prior to serving, comprising the steps of packing a comestible in a hermetically sealed can, forming an opening in one end of said can, injecting steam through said opening directly into said comestible for a predetermined time to heat it to serving temperature and simultaneously to add a predetermined quantity of water to said comestible by condensation of said steam, penetrating the other end of said can with a vent member to temporarily hold the increased volume of said comestible, and pouring said heated comestible through said opening and into a serving receptacle.

3. A method of vending liquid coffee, comprising the steps of preparing a slightly concentrated liquid coffee, packing said slightly concentrated liquid coffee into a sealed container while leaving an unfilled headspace therein, penetrating said container and said comestible with a hollow injection member, injecting steam through said injection member directly into said slightly concentrated liquid coffee for a predetermined time to rapidly heat it to serving temperature and to add sufficient water to it by the condensation of said steam to bring it to a desired non-concentrated condition, and pouring said heated, non-concentrated coffee through the penetrated portion of said container and into a serving receptacle.

4. A method of vending liquid coffee, comprising the steps of preparing a liquid coffee, packing said liquid coffee into a hermetically sealed can while leaving an unfilled headspace within said can, forming an opening in said can, injecting steam through said opening directly into said liquid coffee for a predetermined time to rapidly heat it to serving temperature and simultaneously to add a predetermined quantity of water to it by the condensation of said steam, venting said headspace during the injection of said steam, and pouring said heated liquid coffee through said opening and into a serving receptacle.

5. A method of vending liquid and semi-liquid comestibles to be diluted and heated prior to serving, comprising the steps of preparing a comestible in predetermined concentrated condition, packing said comestible in an hermetically sealed container, forming an opening in said sealed container, and injecting a predetermined quantity of steam through said opening directly into said comestible to heat it to a desired serving temperature and simultaneously to dilute said concentrated comestible with the condensate of said steam to a desired serving concentration, and emptying said heated comestible through said opening and into a serving receptacle for consumption.

6. The method of claim 1 wherein said injection member penetrates both ends of the container and wherein said injection member is then withdrawn from said container to effect emptying of said heated comestible through a penetrated portion thereof into a serving receptacle.

References Cited in the file of this patent
UNITED STATES PATENTS

| | | |
|---|---|---|
| 1,109,976 | Fenn | Sept. 8, 1914 |
| 1,487,169 | Landrum et al. | Mar. 18, 1921 |
| 1,863,447 | Kronquest | June 14, 1932 |
| 2,338,003 | Mills et al. | Dec. 28, 1943 |
| 2,668,550 | Burge | Feb. 9, 1954 |
| 2,883,922 | Andres | Apr. 28, 1959 |
| 2,939,381 | McBride | June 7, 1960 |
| 2,952,202 | Renner et al. | Sept. 13, 1960 |
| 3,071,473 | Churley | Jan. 1, 1963 |